United States Patent Office 2,832,873
Patented Apr. 29, 1958

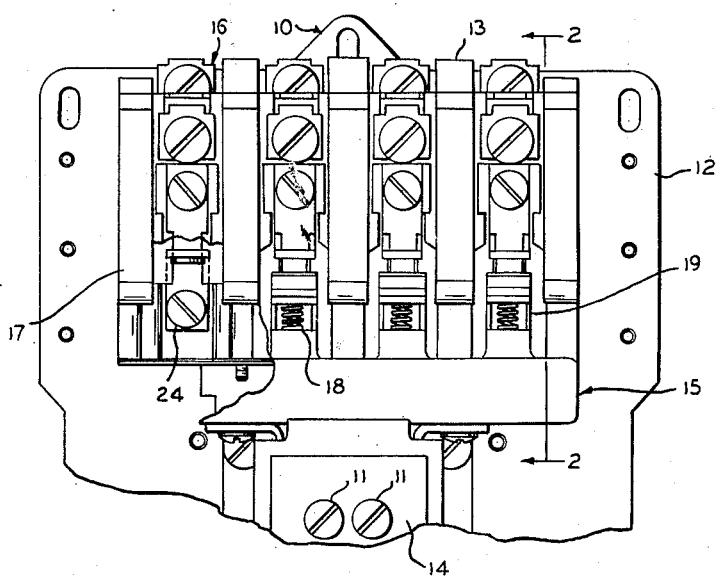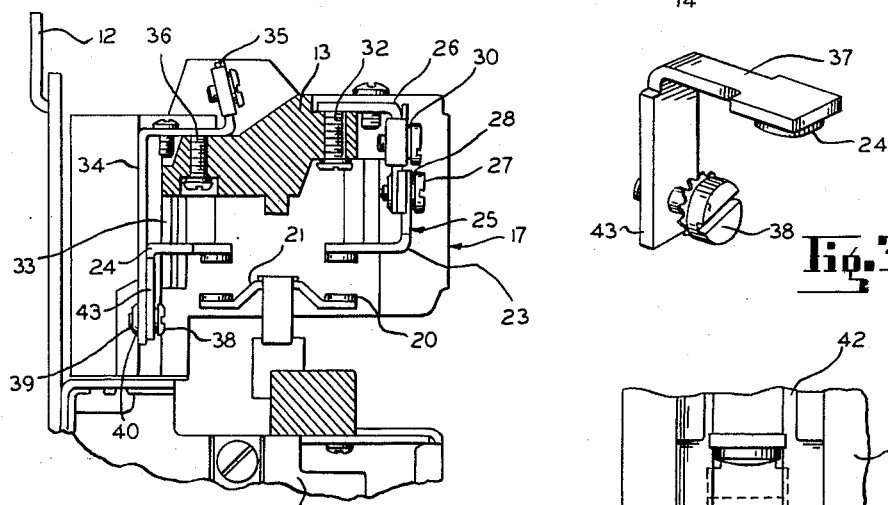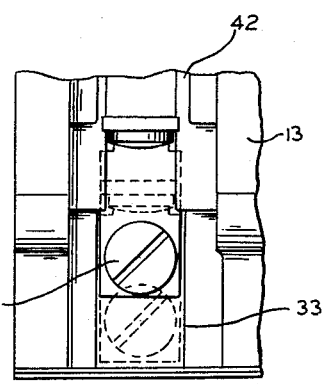

2,832,873

SUPPORT ASSEMBLIES

Paul R. Goudy, Whitefish Bay, Wis., Kenneth G. Sedgwick, Laguna Beach., Fla., and Joseph J. Gribble, Fox Point, Wis., assignors to Square D Company, Detroit, Mich., a corporation of Michigan Application September 14, 1955, Serial No. 534,237

12 Claims. (Cl. 200—166)

The present invention relates to support assemblies and more particularly to support assemblies located in positions which are not easily accessible for positioning and fastening of the component parts.

The equipment being produced today introduces complex functions or capacities which are accompanied by a specialization. The realm of specialization, in many instances, is not limited to organizations which produce the equipment but extends to the user in the form of appropriate repair tools particularly where cost, location, or other circumstances prevent the use of the manufacturers' repair facilities.

In many instances, certain parts of the equipment are intended to be replaced and have a relatively short span of endurance compared to the remainder of the mechanism. As a result, the cost of replacement of these parts could easily slip from a minor part of the original investment or consideration; and the expense or inconvenience assumes major proportions in the form of special tools, etc.

It is an object, therefore, of the present invention to simplify assembly, repair or replacement operations.

Another object is to provide a coupling means between a support or base member and an element which supports the element in alignment with said member.

A further object of the invention is the provision of a fastening means for members to be assembled which supports said member in alignment or engagement whereby the fastening means may be operated to secure said members to one another without the aid of further alignment or support means.

Still another object is to provide coupling means facilitating assembly of members in positions having limited access for alignment and support means.

A further object of the present invention is to provide a coupling means for a contact bracket in a contactor.

Further objects and features of the invention will be readily apparent to those skilled in the art from the specification and appended drawing illustrating certain preferred embodiments in which:

Figure 1 is a frontal view of a contactor embodying the invention, having the lower portion cut away.

Figure 2 is a cross sectional view of the contactor taken along the line 2—2 of Figure 1.

Figure 3 is an enlarged view of a rear or load contact bracket.

Figure 4 is an enlarged sectional view showing the steps in positioning the rear contact bracket for assembly.

Figure 5 is an enlarged view of the front or line contact bracket supported in position by a counterbore in a strap.

Figure 6 is an enlarged view of a modified support assembly.

Referring now to the drawings, wherein like reference characters designate like or corresponding parts throughout the several views, there is shown in Figure 1 which illustrates a preferred embodiment, a contactor 10 supported on a mounting bracket 12. The contactor 10 as shown includes four sets of operating contacts, a contact operating means 14 and a contact carrier 15; and an insulating block 13 provided with a plurality of chambers 16 formed by insulating barriers 17.

The contact operating means 14 usually includes an armature actuated by a coil to position a contact carrier 15 vertically thereby opening and closing the contacts corresponding to each pole. On the upper surface of the contact carrier 15 a plurality of movable contacts, one set for each pole, are resiliently positioned by helical springs 18 in the spring guides 19.

Referring to Figure 2 of the drawings illustrating the relative position of the stationary and movable contacts in normally open relation wherein the insulating block 13 is shown in cross section along the line 2—2 of Figure 1 and an insulating barrier 17. The movable contacts 20 are shown connected to the operating means 14 on carrier 15 and spring guides 19 housing the helical springs 18; the supports 21 for the movable contacts 20 each form a bridge which is biased to the top of the spring guide 19 by the helical spring 18 and extending across the space between the front or line contacts 23 and the rear or load contacts 24.

The front contacts each include a contact bracket 25 coupled to a terminal bracket or strap 26 by a fastening means such as a cap screw 27 or the like, and a locking means or serrated washer 28 on the screw 27 which is suitable for securing leads to associated apparatus. The opening in both the front and rear contact brackets is tapped which accommodates the untapped portion of the screw and loosely threads with tapped portion of the screw or shank. The shank should, preferably, be untapped near the head for a distance equal to the thickness of the bracket strap plus the washer thickness, if used, but tapped to the extent of any penetration of the threaded bore. The strap 26 may be secured to the insulating block by an additional fastening means such as screw 32, and may be provided with a line terminal 30 suitably positioned for connecting the line wires to the pole.

The rear contact bracket 24 shown separately in Figure 3 is supported in a channel 33 in the end of the chamber 16 by the load terminal strap 34 extending vertically in said channel and laterally on top of the insulating block 13 to the load terminal 35. The load terminal strap is secured to the insulating block 13 in a similar manner as the front terminal strap 26 by the shank of the screw 36 extending vertically through said block from the chamber 16 through a threaded opening in the lateral surface of the terminal strap.

The vertical portion contact bracket 43 supporting and positioning the load contact bracket 24 is secured to the terminal strap 34 by a screw 38 or other suitable fastening means having a partially threaded shank extending or projecting into a threaded bore 39 and through a counterbore 40 in the end of the terminal strap 34. The end of the terminal strap 34 adjacent the contact bracket 24 may be modified, as illustrated in Figure 6, by extending or projecting the strap laterally below the end of the adjacent portion of the contact bracket 24, forming a ledge 41, to aid in positioning the contact brackets in assembly by supplementing the vertical support of the shank of screw 38 resting in the counter bore 40.

In operation, the rear contact bracket 24 may be replaced on the strap 34 by removing the contact operating means, including the movable contact assembly. Removal of screws 11 permits the contact operating means to be removed as a unit. The rear contact bracket and fastening means 38 is then accessible between the insulating barriers 17 from the front of the contactor; however, the available space is limited while attempting to align and secure the screw 38 in the bore 39.

Figure 4 illustrates the steps in aligning the rear contact bracket 24 and the shank of screw 38 with the bore 39 in the terminal strap 34. The contact bracket 24 is extended in width over the vertical end portion 43, coinciding in width, and fitting into the channel 33; and a narrower portion 37 for passing between the flanges 42 of the channel 33 in the insulating block 13. Since the flanges 42 terminate along the channel at a distance equal to the length of the extended width portion 43 of the bracket 24 from the bottom; the end portion 43 of the bracket may be placed in a channel below the end of the flanges and slipped upwardly in the channel until the threaded shank portion of the screw 38 is in alignment with the counterbore 40.

A slight pressure exerted on the screw 38 e. g., the flanges positioning the end portion 43 pressing against the threads on the shank, will move the end of the shank into the counterbore whereupon the bracket is supported vertically by the shank on the edge of the counterbore and laterally by the width of the bracket extending into the channel 33 along the flanges 42. This operation may be performed, for example, by supporting the contact portion of the bracket on the end of a screwdriver and placing the bracket into the chamber and positioning as described above. After the screw 38 has been inserted and aligned with the counterbore 40 supporting the bracket in the channel, the bracket may be secured to the terminal strap 34 by simply turning the screw 38 into the bore 39.

The front contact bracket 25 is similar in configuration or shape to the rear contact bracket except that the contact or the contact button 22 is on the reverse or opposite side of the bracket strap to provide a normally closed circuit upon interchange of front and rear contact brackets and relocating the movable contact bridge 21 in its guide, above the contacts, and inverting said bridge to position the contacts of the movable bridge and stationary brackets in opposing relation.

Figure 5 illustrates the front contact bracket supported and aligned by the terminal strap or bracket 26 in the counterbore 45. Although access to the front contact can be made more easily than the rear contact bracket, the insulating barrier 17 between poles and contact structure presents a similar problem to the one described above in connection with the rear contact bracket 24, i. e., the fastening means is not accessible to both a positioning and aligning means as well as a securing means.

The front contact bracket may be positioned and aligned by inserting the end of the shank of the screw 27 in the counterbore 45. The end portion 47 of the bracket 25 has a threaded opening 48 through which the threaded portion of the shank is turned until the screw 27 rests in the opening 48 on an unthreaded portion; a construction similar to the structure of the rear contact bracket. Since the end of the shank of the screw 48 approaches or is at the center of gravity of the bracket, the bracket will balance on the edge of the counterbore 45 in alignment with the bore 46 in the terminal strap 26. The screw 27 may then be turned into the strap 26 threading in the bore 46 and securing the front contact bracket to the terminal strap.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In combination; a base member, a threaded bore and a counterbore in said member; an element to be secured to said member and having a threaded opening therein; a screw for securing said element to said member, said screw having a head and a shank including a threaded portion threading in said opening to project therethrough whereby the screw is retained therein and supported in said opening by an unthreaded portion adjacent the head, said shank cooperating with said counterbore to support said screw and element in position whereby the screw may be threaded in said bore to secure the element to said base member.

2. In combination, a base member normally mounted on a vertical wall, a threaded bore and a counterbore in a side of said member; an element to be secured to a vertical side of said member and having a threaded opening; a screw for securing said element to said member, said screw having a head and a shank including a threaded portion threading in said opening to project therethrough whereby the screw is retained therein and supported in said opening by an unthreaded portion adjacent the head, said shank cooperating with said counterbore to support said element and the screw in alignment with said bore for threading whereby the screw may be turned into the base member to secure the element to said member.

3. In combination, an insulating block, a conductive strap secured to said block and a threaded bore and a counterbore in said strap; a contact bracket to be secured to said strap; a screw for securing said bracket to said strap, said screw having a head and a shank including a threaded portion threaded through said opening whereby the screw is retained therein and supported in said opening by an unthreaded portion adjacent the head, said shank cooperating with the counterbore in said strap to support said screw and bracket in position for threading the shank in said bore thereby securing the element to said conductive strap and block.

4. The combination recited in claim 3 wherein the ends of the contact bracket are approximately perpendicular the axis of the bore and counterbore is substantially horizontal and the end of the shank in the counterbore extends toward the center of gravity of the contact bracket to support the bracket in approximate alignment with the axis of the bore.

5. A support assembly comprising; a base, an element, and a channel in said base for receiving said element, retaining ribs along the longitudinal edges of said channel; coupling means projecting through and retained by said element, cooperative means in said channel for receiving said coupling means to support said element between the retaining ribs and coupling means whereby the coupling means is aligned with said cooperative receiving means for securing said coupling means and element to said base.

6. A support assembly comprising; a base, an element, and a channel in said base for receiving said element, retaining ribs along a substantial portion of the longitudinal edges of said channel whereby the remaining portion of the channel is open for lateral insertion of said element for longitudinal movement under said ribbed portion; fastening means having a shank projecting through and retained by said element, a bore and counterbore in the bottom of said channel for removably securing said shank, said counterbore receiving the end of said shank to support said element in the channel between the fastening means and said ribs whereby the shank may be positioned in said bore to secure the element to said base.

7. In a switch unit of the type described a bracket assembly comprising; a block, a contact bracket having a threaded opening in one end thereof, a channel in said block having an open end for receiving the end of said bracket, flanges along the open longitudinal edges of said channel, said flanges projecting across the channel to restrict lateral movement of said bracket, fastening means projecting through said opening and retained by the threads in said opening, and cooperative means in said channel for receiving said fastening means and supporting said bracket in position between the fastening means and flanges adjacent said opening whereby the fastening means is aligned with said cooperative means to secure bracket to the block.

8. In a contactor of the type described having an insulating block, a plurality of open chambers in said block and a movable contact member in each chamber; said block having an open ended channel in each chamber and flanges projecting across each channel along its longitudinal edges, stationary contact brackets each having a contact tip near one end and mounted in each channel, said brackets comprising straps of conductive material at least a portion of which is extended in width to be restrained laterally in said channels by said flanges and projecting perpendicular to substantially the remainder of said strap, an opening in the extended portion of each strap, fastening means retained by each strap having a shank projecting through said opening, and a bore and counterbore in the bottom of each channel for removably securing individual shanks, said counterbore, shank and flanges in each channel cooperating to support individual straps in position for inserting the shank in said bore to secure the contact bracket to said block.

9. In a contactor of the type described having an insulating block, a plurality of open chambers in said block and a movable contact in each chamber; a block having an open ended channel in each chamber and flanges projecting across each channel along its longitudinal edges, right angle stationary contact brackets mounted in each channel, said brackets comprising a strap of conductive material a portion of which is extended in width to be restrained laterally in said channel by said flanges and at least the section of the strap encompassing the right angle bend narrowing in width and passing between said flanges to permit the remainder of the bracket to extend outside said channel, an opening in the extended portion of each strap, fastening means retained by each strap having a shank projecting through said opening, and a bore and counterbore in the bottom of each channel for removably securing individual shanks, a ledge below said channel, said counterbore, shank, ledge and flanges individually to each channel cooperating to support an individual strap in position for inserting the shank in said bore, to secure the individual contact brackets to said block, and align the contact button for operation with corresponding movable contacts in the same chamber.

10. An assembly for securing a contact bracket in a block of insulating material comprising; a terminal strap, a bore and counterbore in said strap, an arcuately formed contact bracket having a threaded opening in one end and a contact button on the other, a screw having a threaded shank projecting through said opening, an open chamber in said block, housing said strap and bracket; said strap being secured in the end of said chamber in said block, said shank cooperating with said counterbore upon insertion of the end of said shank into the counterbore to support said bracket near its center of gravity and position the screw for turning into said bore whereby the bracket is secured to the block and electrically connected to said terminal.

11. In a switching assembly of the type described, a right angle contact bracket having a tapped opening in one end and a contact tip on the other end, means for securing said bracket to the assembly including mounting means for said bracket forming a part of said assembly having a tapped bore and a counterbore, a screw having a shank extending through said opening between the ends of said bracket, said counterbore being of sufficient depth to maintain the end of said screw in the counterbore when supporting said bracket thereby balancing the bracket to approximately align the axis of the shank with the axis of said bore for positioning said shaft in said bore and to secure the bracket to said mounting means.

12. The switching assembly of claim 11 in which the mounting means has a recessed portion forming a channel approximately the width of the bracket adjacent the end having the tapped opening whereby the recessed portion of the mounting means cooperates with the ends of the bracket having the opening to align the bracket with the channel upon positioning the screw in the bore securing the bracket to said mounting means.

References Cited in the file of this patent

UNITED STATES PATENTS

| | | |
|---|---|---|
| 447,775 | Higbee | Mar. 10, 1881 |
| 2,529,833 | Luce | Oct. 28, 1947 |
| 2,516,572 | Heller | July 25, 1950 |
| 2,669,613 | Despard | Feb. 16, 1954 |